United States Patent
Ghergu et al.

(10) Patent No.: US 12,126,505 B2
(45) Date of Patent: Oct. 22, 2024

(54) DATA MIGRATION IN APPLICATION PERFORMANCE MONITORING

(71) Applicant: International Business Machines Corporation, Armonk, NY (US)

(72) Inventors: Laurentiu Gabriel Ghergu, Bucharest (RO); Erik Rueger, Ockenheim (DE); Sorina Radulescu, Bucharest (RO); Nikica Fulir, Varazdin (HR)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 17/654,287

(22) Filed: Mar. 10, 2022

(65) Prior Publication Data

US 2023/0308369 A1 Sep. 28, 2023

(51) Int. Cl.
*H04L 43/04* (2022.01)
*H04L 43/00* (2022.01)
*H04L 43/022* (2022.01)
*H04L 43/08* (2022.01)
*H04L 43/18* (2022.01)

(52) U.S. Cl.
CPC ............ *H04L 43/04* (2013.01); *H04L 43/022* (2013.01); *H04L 43/08* (2013.01); *H04L 43/14* (2013.01); *H04L 43/18* (2013.01)

(58) Field of Classification Search
None
See application file for complete search history.

(56) References Cited

U.S. PATENT DOCUMENTS

| | | | |
|---|---|---|---|
| 7,624,176 B2 | 11/2009 | Dickerson | |
| 11,611,497 B1* | 3/2023 | Manikanta | ............. H04L 67/02 |
| 2007/0150568 A1 | 6/2007 | Ruiz | |
| 2007/0256058 A1 | 11/2007 | Marfatia | |
| 2014/0282407 A1 | 9/2014 | Channamsetti | |

OTHER PUBLICATIONS

"Agile Requirements Designer", Broadcom, last printed Mar. 8, 2022, 10 pages, <https://www.broadcom.com/products/software/continuous-testing/agile-requirements-designer>.
"Code Export", Selenium IDE, Last updated on Oct. 28, 2019, 10 pages, <https://www.selenium.dev/selenium-ide/docs/en/introduction/code-export>.
"Test Automation tool: Migration-Commercial to open Source", wipro, 2019—Oct. 2020, 8 pages, <https://www.wipro.com/content/dam/nexus/en/service-lines/applications/latest-thinking/test-automation-tool-migration-commercial-to-open-source.pdf>.
"Use CA App Synthetic Monitor to Enhance Application Monitoring", Broadcom, CA Application Performance Management—10.7, Last Updated Dec. 6, 2021, 4 pages, <https://techdocs.broadcom.com/us/en/ca-enterprise-software/it-operations-management/application-performance-management/10-7/integrating/use-ca-app-synthetic-monitor-to-enhance-application-monitoring.html>.

(Continued)

*Primary Examiner* — Brian Whipple
(74) *Attorney, Agent, or Firm* — Joseph P. Curcuru (57) ABSTRACT

In an approach to improve data migration in application performance monitoring, embodiments execute a synthetic transaction to monitor an application, and monitor network traffic during the execution of the synthetic transaction. Further, embodiments extract a plurality of parameters indicative of the synthetic transaction from the network traffic, and generate a script, based on the extracted plurality of parameters and a predetermined template, that generates the synthetic transaction.

17 Claims, 6 Drawing Sheets

(56) References Cited

OTHER PUBLICATIONS

Howard, Oliver, "Selenium and Selenium IDE Migration | Testing Made Easier", DZone, Aug. 17, 2020, 4 pages, <https://dzone.com/articles/selenium-and-selenium-ide-migration-testing-made-e>.
Kirstens, et al., "Cross Site Request Forgery (CSRF)", OWASP, Copyright 2022, OWASP Foundation, Inc., 11 pages, <https://owasp.org/www-community/attacks/csrf#>.

* cited by examiner

DATA MIGRATION IN APPLICATION PERFORMANCE MONITORING

BACKGROUND OF THE INVENTION

The present invention relates generally to the field of data monitoring, and more particularly to data migration in application performance monitoring.

Application Performance Monitoring (APM) is a domain in which special software is used to monitor the availability and performance of business applications. More generally, APM enables IT operations and DevOps and personnel to detect, isolate and diagnose problems in their hybrid cloud development and production environments. APM enables various capabilities such as Application Diagnostics and Transaction profiling. Further, APM solutions may be available in both software-as-a-service (SaaS) hybrid and on-premises delivery models. There are two types of options to monitor and determine if a business application is working properly. The first is synthetic transactions which comprises execution of a Selenium (or related) script by an agent that is clicking through the application to confirm that the specific feature is working properly as part of a business transaction. For example, a Selenium script can be executed by a software agent on a recurrent schedule to confirm that the monitored application is up, and the business transaction works as expected. The second is uptime metrics (e.g., ping, wget, and/or others known in the art) where uptime metrics comprises checking that the virtual machine (VM) of the application is up and running using network level checks (i.e., ping, locally installed agent capturing CPU usage).

SUMMARY

Embodiments of the present invention disclose a computer-implemented method, a computer program product, and a system for migration in application performance monitoring, the computer-implemented method comprising executing a synthetic transaction to monitor an application; monitoring network traffic during the execution of the synthetic transaction; extracting a plurality of parameters indicative of the synthetic transaction from the network traffic; and generating a script, based on the extracted plurality of parameters and a predetermined template, that generates the synthetic transaction.

DETAILED DESCRIPTION

Embodiments of the present invention recognize that as there are multiple application performance monitoring (APM) solutions from various vendors, each may have their own proprietary scripting languages for defining and executing synthetic transactions. Therefore, embodiments of the present invention recognize that, due to each vendor having a different proprietary scripting language, there is no possibility to migrate scripts from one language to another without re-writing the entire code base in case an enterprise wishes to change the APM vendor. Embodiments of the present invention recognize that one particular issue with script migration is the automatic correlation of requests that is required as a user makes multiple correlated hypertext transfer protocol (HTTP)/file transfer protocol (FTP) requests while navigating a website. For example, after the login procedure, the following requests made by the browser to a particular website include custom authentication cookies that need to be included in every request and are only obtained after the first request was completed (to the login page). Another example of request correlation is the situation when the website has a cross-site request forgery (CSRF) protection mechanism. In this situation, the website will include a custom token in the HTML code of one of the pages, for example as a <input type="hidden"> value and the client side JavaScript of the website is coded to include that value as a query parameter in all the following requests made to the website.

Embodiments of the present invention recognize that another correlation issue occurs when a specific asynchronous JavaScript and extensible markup language (XML) (asynchronous JavaScript and XML (AJAX)) request is attempting to download a custom file but the uniform resource locator (URL) of the file is automatically generated and inserted in the hypertext markup language (HTML) code as a "Download" button. Embodiments of the present invention recognize that if the URL is changed on each page refresh, on the network there will be two correlated requests executed: first the browser will download the HTML page with the button, and second when the user is clicking the link a new request will be made at a different URL (which changes each time) in order to download the file.

Embodiments of the present invention recognize that additional complexities are added by the migration as the Cross-Origin Resource Sharing (CORS) feature can be enabled for the website and the final code can be made more generic if the domain specific headers are extracted as a variable in the final script as these will be included in all requests. Embodiments of the present invention recognize that no known solution exists for correlating requests while migrating scripts that execute synthetic transactions without re-writing those scripts from scratch. Further, embodiments of the present invention recognize that various industry solutions exist for generating code in a different language by static analysis of the code in the original language. These do not apply to our use case as it can be that source code is not available (files are running in compiled version) or a convertor between specific languages doesn't exist. Thus, embodiments of the present invention recognize that a much more generic approach is desired.

Embodiments of the present invention address and solve the problems stated above by automatically removing vendor lock-in situations and ease the transfer of clients to APM services/solutions and reducing the amount of manual work necessary to convert synthetic transaction scripts and hence reduce the overall migration cost. More specifically, embodiments of the present invention improve the art and solve the particular issue involving the correlation request between custom synthetic transactions (e.g., synthetic business transactions) in the "application performance monitoring" domain of software offerings by (i) executing a synthetic transaction to monitor performance of a business application, (ii) monitoring network traffic during transaction execution, (iii) extracting a plurality of parameters indicative of the synthetic transaction from the network traffic, and (iv) using the extracted parameters and a template to generate a script that would result in the same synthetic transaction.

Implementation of embodiments of the invention may take a variety of forms, and exemplary implementation details are discussed subsequently with reference to the Figures (i.e., FIG. 1A-FIG. 5).

Figure 1A:
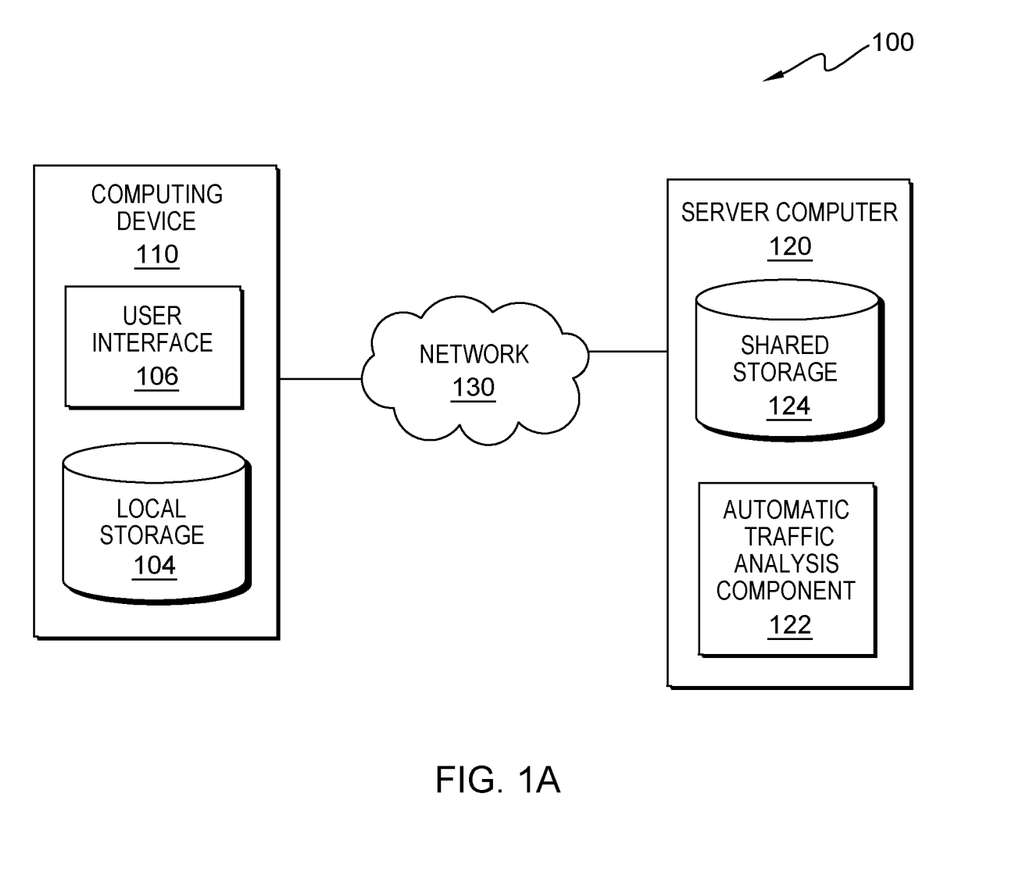
FIG. 1A is a functional block diagram illustrating a distributed data processing environment, in accordance with an embodiment of the present invention.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 5.

User interface (interface) 106 provides an interface to automatic traffic analysis (ATA) component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 5. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 5. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110 and/or server computer 120, via network 130.

In various embodiments, component 122 executes ATA (Automatic Traffic Analysis), wherein ATA is an implemented method by which APM offerings/services can automatically generate scripts that an agent can execute for replicating correlated synthetic transactions made by competitor offerings. ATA reduces the time required for developers who support an agent script migration between two vendors in the application performance monitoring space. Further, component 122 captures, by a network traffic collector, the HTTP traffic while the script in a first language is executed and then automatically generates the agent script in a second language so that it executes the correlated requests in the same order. In various embodiments, the first and second language are predetermined and/or preselected by a user (e.g., developer) or program. See FIG. 1B.

In various embodiments, component 122 improves the art by automatically detecting the correlation between requests performed by custom scripts that execute synthetic business transactions by identifying the query parameters, headers dynamic values, POST body objects and searching through previous requests for the same label or value which will allow the correlation to be identified. Additionally, component 122 improves the art and solves the particular issues stated above by eliminating the manual effort done by developers while migrating custom business transaction scripts from one APM vendor to another and enables code generation issue detection due to an embedded alerting mechanism. Further, component 122 improves the art and solves the particular issues stated above by combining insights from multiple domains in order to automatically analyze the correlation between asynchronous JavaScript and XML (AJAX) requests (security mechanisms, custom programming situations, and/or any AJAX requests known and understood in the art).

In various embodiments, component 122 solves the problems stated above by automatically removing vendor lock-in situations and ease the transfer of clients to APM services/solutions and reducing the amount of manual work necessary to convert synthetic transaction scripts and hence reduce the overall migration cost. More specifically, component 122 improves the art and solves the particular issue involving the correlation request between custom synthetic business transactions in the "application performance monitoring" domain of software offerings by (i) executing a synthetic transaction to monitor performance of a business application, (ii) monitoring network traffic during transaction execution, (iii) extracting a plurality of parameters indicative of the synthetic transaction from the network traffic, and (iv) using the extracted parameters and a template to generate a script that would result in the same synthetic transaction.

Figure 1B:
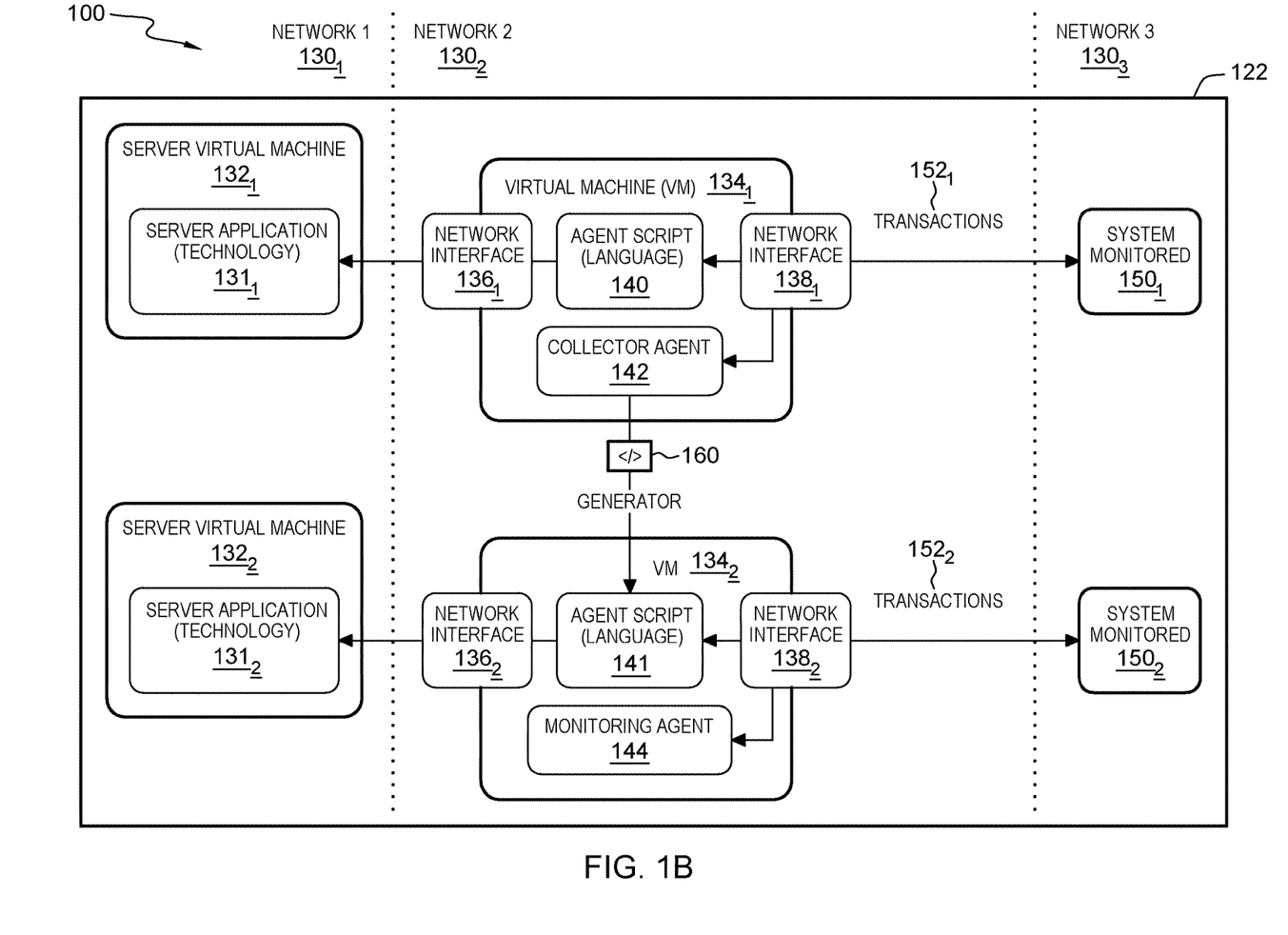
FIG. 1B is a functional block diagram illustrating a distributed data processing environment of an automatic traffic analysis component, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes component 122, 110, server virtual machine $132_1$-$132_2$, virtual machine (VM) $134_1$-$134_2$, generator 160, transactions $152_1$-$152_2$, and system monitored $150_1$-$150_2$ interconnected over network $130_1$-$130_3$.

Figure 3:
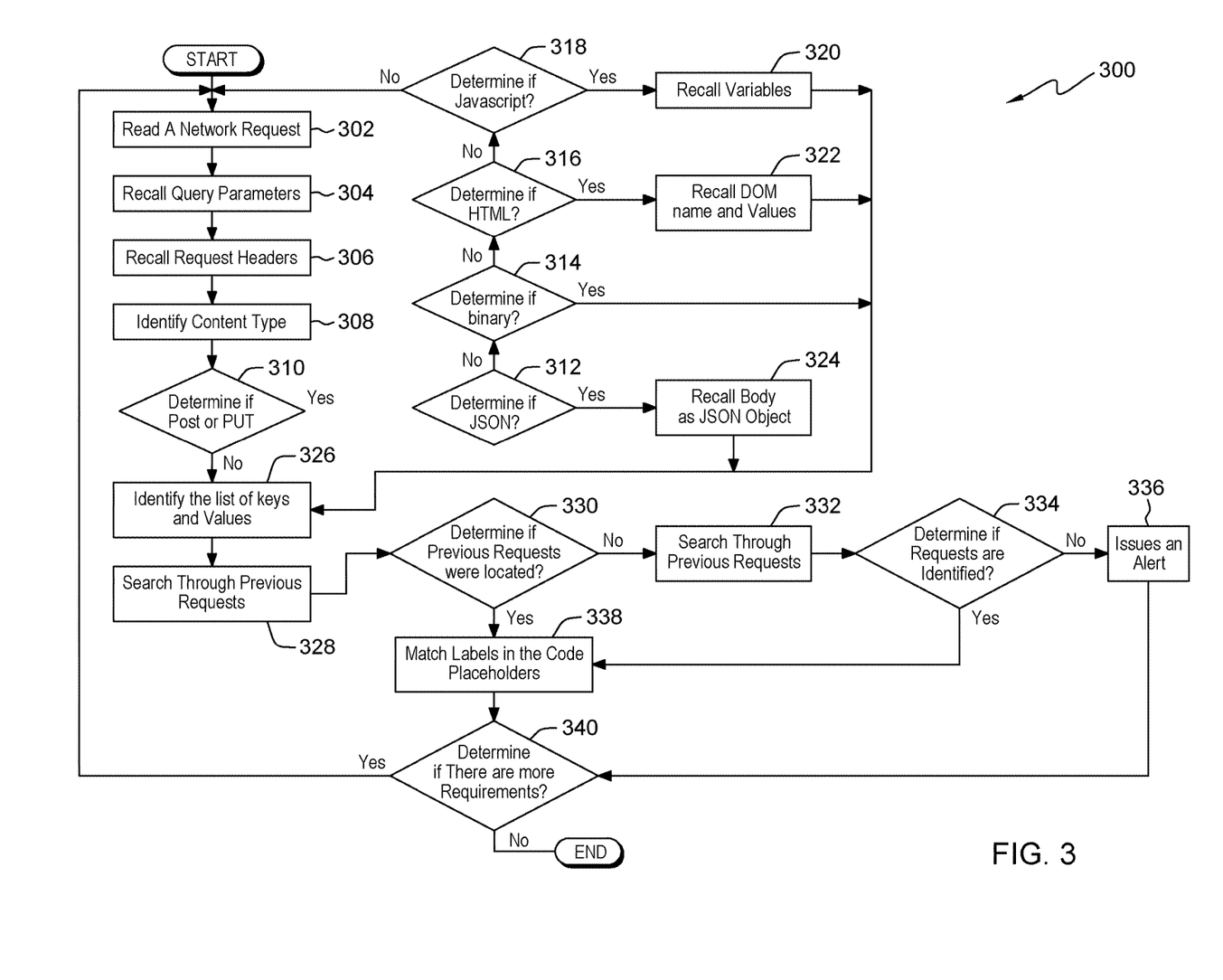
FIG. 3 illustrates operational steps of the automatic traffic analysis component, on a server computer within the distributed data processing environment of FIGS. 1A-1B, for a correlation analyzer in data migration in application performance monitoring, in accordance with an embodiment of the present invention.

In the depicted embodiment, FIG. 1B comprises network $130_1$-$130_3$, server virtual machine $132_1$-$132_2$, virtual machine (VM) $134_1$-$134_2$, generator 160, transactions $152_1$-$152_2$, and system monitored $150_1$-$150_2$. In various embodiments, a request executed by a script comprises head, query, URL, body, content-type and other application layer protocol (e.g., HTTP) related characteristics (data). FIG. 3 will define a step-by-step method for analyzing the correlation between requests by looking into predetermined characteristics.

In various embodiments network $130_1$-$130_3$ may be $123_{1-N}$, wherein N represents a positive integer, and accordingly the number of scenarios implemented in a given embodiment of the present invention is not limited to those depicted in FIG. 1B. In various embodiments server virtual machine $132_1$-$132_2$ may be $132_{1-N}$, wherein N represents a positive integer, and accordingly the number of scenarios implemented in a given embodiment of the present invention is not limited to those depicted in FIG. 1B. In various embodiments VM $134_1$-$134_2$ may be VM $134_{1-N}$, wherein N represents a positive integer, and accordingly the number of scenarios implemented in a given embodiment of the present invention is not limited to those depicted in FIG. 1B. In various embodiments transactions $152_1$-$152_2$ may be transactions $152_{1-N}$, wherein N represents a positive integer, and accordingly the number of scenarios implemented in a given embodiment of the present invention is not limited to those depicted in FIG. 1B. In various embodiments system monitored $150_1$-$150_2$ may be system monitored $150_{1-N}$, wherein N represents a positive integer, and accordingly the number of scenarios implemented in a given embodiment of the present invention is not limited to those depicted in FIG. 1B.

ATA component 122 may generate a new script (including in a different language) that executes received and/or generated requests in the same order the requests are received and/or generated, wherein ATA component 122 takes into account the wait time between the original requests and identifies the correlation based on the mentioned data analysis above (analyzing the correlation between requests by looking into predetermined characteristics, see FIG. 3 below), wherein identified correlation performs data analysis on the network traffic (a.k.a. the data) in order to capture the correlation between the requests. Network interface $136_{1-2}$ operate as a network interface known and understood in the art, and in this particular embodiment act as the point of interconnection between network $130_1$ and $130_2$ for server virtual machine $132_{1-2}$ and VM $134_{1-2}$ respectively. Similarly, network interface $138_{1-2}$ operate as a network interface known and understood in the art, and in this particular embodiment act as the point of interconnection between network $130_2$ and $130_3$ for VM $134_{1-2}$ and system monitored $150_{1-2}$ respectively.

In the depicted embodiment collector agent 142 executes on VM $134_1$; however, in other embodiments, collector agent 142 may execute anywhere within the distributed environment. Collector agent 142 is the network traffic collector that captures the traffic generated by a first script (i.e., agent script (language) 140). Further, generator 160 is a command line utility executed by collector agent 142 during the migration for controlling the start/stop of the capture and the generation of the script by agent script (language) 141. In various embodiments, collector agent 142 receives a command from a developer performing a data migration controlling the start/stop of the capture and the generation of the script in language 141 to execute generator 160.

In the depicted embodiments, component 122 monitors and collects transactions $152_{1-2}$ to and from system monitored $150_1$, language 140, and technology $131_1$, via network interface $138_1$, network interface $136_1$, and collector agent 142. Further, network interface $138_1$ directs data from transactions $152_1$ and directs the collected data to collector agent 142 and language 140. Similarly, network interface $138_2$ directs data from transactions $152_2$ and directs the collected data to monitoring agent 144 and language 141. In various embodiments, transactions $152_{1-2}$ may be business transactions.

In the depicted embodiments, monitoring agent 144 executes on VM $134_2$; however, in various embodiments, VM $134_2$ may execute anywhere within the distributed environment Monitoring agent 144 is a network traffic collector that captures the traffic generated by language 141 and outputs to a user (e.g., a developer) the specific requests where special attention is needed as there seem to be a mismatch between the two executions. For example, if monitoring agent 144, when counting the total number of requests executed by language 141, realizes that the total number of requests, identified in transactions $152_2$ by network interface $138_2$, do not match the total number of original requests executed by language 140 then component 122 generates and outputs a warning message (i.e., visual display) and a stack of the requests executed by language 141 and language 140 (e.g., HTTP stack and/or IP Stack), via interface 106, to the user (e.g., developer), wherein the output warning message is a different type of view for debugging. In various embodiments, while comparing the traffic from language 140 with the traffic from agent script 141, component 122 considers the overall understanding gained by ATA during the correlation analysis. System monitored $150_1$ and $150_2$ are each application that are currently being supervised by the APM program/service. Server application (technology) $131_1$ and $131_2$ are each part of the APM monitoring and are the central location where the APM agents collect the monitored data.

For example, technology $131_1$ sends a start execute command to language 140 via network call going through network interface $136_1$. Language 140 executes business transactions $152_1$ by making calls through network interface $138_1$ to the web interface of system monitored $150_1$. Further, in this example, collector agent 142 captures the network traffic on network interface $138_1$ which was generated by language 140 as it runs a command. Generator 160 executes correlation analyzer in data migration in application performance monitoring, discussed in FIG. 3, concurrently with the data collected by collector agent 142 to generate language 141. Technology $131_2$ makes a network call, via network interface $136_2$, to begin the execution of language 141, wherein language 141 executes the same transactions that are executed by language 140, via the $138_2$. Additionally, in this example, the web interface of system monitored $150_2$ will receive the executed transactions from language 141 and provide a response. Monitoring agent 144 will capture the traffic (transactions $152_2$) and compare the timings and count of requests to confirm they are similar/the same to the requests generated by language 140, wherein the comparison of the requests are similar/same if they are within a predetermined range or exceed a predetermined limit. Similarity between requests executed by language 140 and language 141 may be determined by identifying whether the number of calls executed by language 141 are identical to the number of calls executed by the language 140. Component 122 may determine timing by measuring and comparing the total execution time of language 140 and total execution time of language 141. If the measured total execution times between language 140 and 141 are within a predetermined range and/or parameter then the timings are labeled as similar (e.g., the difference is smaller than 5% where 5% is a configuration parameter for ATA).

Figure 2:
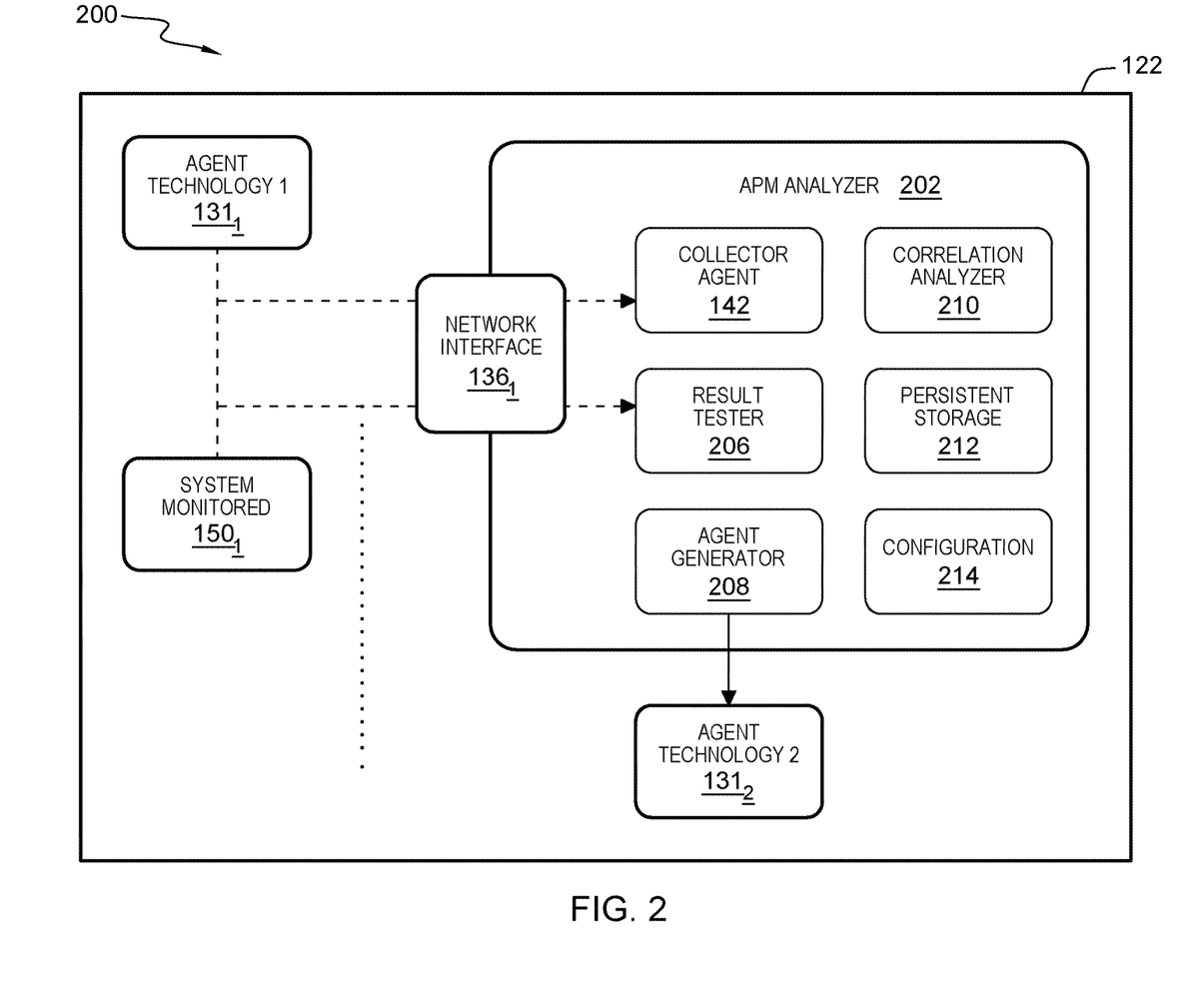
FIG. 2 is a functional block diagram illustrating a distributed data processing environment of the automatic traffic analysis component, in accordance with an embodiment of the present invention.

FIG. 2 is a functional block diagram illustrating a distributed data processing environment, generally designated 200, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 200 includes component 122, server application (technology) $131_1$ and $131_2$, system monitored $150_1$, APM analyzer 202 and network interface $136_1$.

In the depicted embodiment, component 122, via configuration component (configuration) 214 and persistent storage 212, stores specific configuration data as well as the captured network traffic. For example, the network interface card from where the traffic is sniffed. A server can have multiple network interface cards plugged in. Collector Agent 142 is a traffic collector that is used to capture application layer (e.g., HTTP) requests & responses for both a first script and a second script (i.e., agent technology $131_1$ and agent technology $131_2$, respectfully). Information from the first script (i.e., agent technology $131_1$) is fed into or received application performance monitoring (APM) analyzer 202, wherein APM analyzer 202 may determine the overall success of the migration and the key points where problems can be located. In the depicted embodiment, agent generator 208 creates the second script based on the information provided by correlation analyzer 210 as well as the other components. In various embodiments, agent generator 208 creates the second script based on the information provided by correlation analyzer 210 and the preset code fragments stored in persistent storage 212 for various activities and for replacing specific tokens like {URL} with the actual data captured. The code fragments will for example make an Ajax power-on self-test (POST) request on the network or introduce a delay simulating the wait time of a user. Result tester 206 compares the traffic generated by the first script (i.e., agent technology $131_1$) with the traffic generated by the second script (i.e., agent technology $131_2$) in order to determine if the migration was successful or if there is any specific area where the developer needs to perform manual analysis. The steps of the correlation analyzer are presented in below in FIG. 3.

FIG. 3 illustrates operational steps of component 122, generally designated 300, in communication with server computer 120, within distributed data processing environment 100 of FIG. 1A and/or FIG. 1B, for correlation analyzer in data migration in application performance monitoring, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 122 reads a network request. In various embodiments, component 122, via the correlation algorithm, searches through the information stored for previous requests in shared storage 126 and/or local storage 104 and executes (generally named "label") comparison between the data found in previous requests and the current request.

In step 304, component 122 recalls query parameters. In various embodiments, component 122 recalls one or more query parameters from shared storage 126 and/or local storage 104 based on the read network request. The query parameter recall enables component 122 to identify cross site request forgery (CSRF) parameters set in previous calls as there will be a label (key) with the token value in previous requests and in the current request. If component 122 does not understand the semantic purpose of the value (that it's a CSRF) token, then component 122 correlates the requests and uses the current information (token value) in a follow-up request as the key will be identical.

In step 306, component 122 recalls request headers. In various embodiments, component 122 recalls one or more request headers from shared storage 126 and/or local storage 104 based on the one or more network requests.

In step 308, identifies content type. In various embodiments, component 122 identifies one or more content types of the recalled query parameters, request headers, and/or read network request.

In step 310, component 122 determines if the request is a POST or hypertext transfer protocol (Put) request. In various embodiments, component 122 determines if the receive and/or read network request is a POST or Put request. For example, determining the request is a POST request on the network or a request to introduce a delay simulating the wait time of a user. In the depicted embodiment, if component 122 determines that the request is a POST or PUT request (Yes step), then component 122 advances to step 312; however, if component 122 determines the request is not a POST or PUT request (No step), then component 122 advances to step 326.

In step 312, component 122 determines if the format of the request is JSON. In the depicted embodiment, if component 122 determines that the format of the request is JSON (Yes step), then component 122 advances to step 324; however, if component 122 determines that the format of the request is not JSON (No step), then component 122 advances to step 314.

In step 314, component 122 determines if the format of the request is binary. In the depicted embodiment, if component 122 determines that the format of the request is binary (Yes step), then component 122 advances to step 326; however, if component 122 determines that the format of the request is not binary (No step), then component 122 advances to step 316.

In step 316, component 122 determines if the format of the request is HTML. In the depicted embodiment, if component 122 determines that the format of the request is HTML (Yes step), then component 122 advances to step 322; however, if component 122 determines that the format of the request is not HTML (No step), then component 122 advances to step 318.

In step 318, component 122 determines if the format of the request is JavaScript. In the depicted embodiment, if component 122 determines that the format of the request is JavaScript (Yes step), then component 122 advances to step 320; however, if component 122 determines that the format of the request is not JavaScript (No step), then component 122 advances to step 302. In various embodiments, component 122, via algorithm analyzes HTML and JavaScript files. For the HTML, there is a limited set of setting values in code like using "hidden" fields.

In step 320, component 122 recalls JavaScript variables. In various embodiments component 122 recalls JavaScript variables associated with the request and/or similar past requests from shared storage 124 and/or local storage 104.

In step 322, component 122 recalls document object model (DOM) name and values. In various embodiments component 122 recalls DOM name and values associated with the request and/or similar past requests from shared storage 124 and/or local storage 104.

In step 322, component 122 recalls a body as a JSON object. In various embodiments component 122 recalls JSON object associated with the request and/or similar past requests from shared storage 124 and/or local storage 104.

In step 326, component 122 identifies the list of keys and values. In various embodiments, component 122 identifies a list of keys and values associated with the network request. In various embodiments, component 122 may parse the code and identify a list of the locations of values with the "hidden fields" (e.g., there is a limited number of techniques of storing back-end generated values in HTML for JavaScript access and use in follow-up AJAX calls—hidden fields, embedded AJAX etc.) based on key or value matching.

In step 328, component 122 searches through previously received requests. In various embodiments, component 122 retrieves and searches through previously received request stored in shared storage 126 and/or local storage 104 that are similar and/or associated with the current network request.

In step 330, component 122 determines if the previous request were located. In various embodiments, component 122 determines if the previous request were located and/or retrieved from shared storage 126 and/or local storage 104. In the depicted embodiment, if component 122 determines that the previous request have been located and/or retrieved from shared storage 126 and/or local storage 104 (Yes step), then component 122 advances to step 338; however, if component 122 determines that the previous request were not located and/or retrieved from shared storage 126 and/or local storage 104 (No step), then component 122 advances to step 332.

In step 332, component 122 searches through previous requests. In various embodiments, component 122 parses through data stored on shared storage 126 and/or local storage 106 until one or more previous requests that similar and/or associated with the current network request are identified.

In step 334, component 122 determines if the previous requests are identified. In various embodiments component 122 determine if one or more previously stored requests that similar and/or associated with the current network request are identified. In the depicted embodiment, if component 122 determines that the previous request have been identified in shared storage 126 and/or local storage 104 (Yes step), then component 122 advances to step 338; however, if component 122 determines that the previous request have not been identified in shared storage 126 and/or local storage 104 (No step), then component 122 advances to step 336.

In step 336, component 122 issues an alert to the user. In various embodiments, component 122 executes (i.e., issues) a notification to the user, via interface 106, to alert the user that the previous requests cannot be identified/located on shared storage 126 and/or shared storage 104. In various embodiments, the notification is a predetermined alert notification. In other embodiments the notification is a predetermined responsive prompt that alerts the user that the previous requests cannot be identified/located on shared storage 126 and/or shared storage 104 and queries the user to help located the requested data (e.g., previous request) or upload the requested data.

In step 338, component 122 matches the labels in the code placeholders. In various embodiments, component 122 matches the labels in the code placeholders by performing label (key) matching with previous requests and performing value matching. In some embodiments, as the network traffic can contain the same value but with different labels, component 122 heuristically approximates the correlation between labels in the code placeholders. Component 122 may manage a series of calls on the network (different URLs), wherein each call can have multiple parameters. For some parameters component 122 may approximate the value at with the parameters should be applied. For the approximation of the parameter value, component 122 may check the query parameter section of each URL. The query parameter section may comprise key-value pairs. Component 122 may identify the correlation between two keys in the key-value pairs by identifying two keys in two different URLS have the same value. Subsequently, component 122 may heuristically estimate that the key is referring to the same concept and hence component 122 use the same value in future requests. In various embodiments, the correlation information/data identified and/or generated in step 338 may be stored via code placeholders in an ATA software.

For example, a backend is implementing the CSRF (or related) mechanism where the backend is generating a hidden field with the value="#231431@$@#o3" and name="theCSRF." In this example, the website is JavaScript code which reads the name (i.e., key) and then stores the value in a global variable in the browser memory (not accessible by ATA). The JavaScript will generate an AJAX request to the backend and append "&csrf=#231431@$@#o3" in the URL. In this example, the two labels are different (theCSRF vs csrf); however, ATA (i.e., component 122) approximates that "#231431@$@#o3" is to be populated from the HTML file because after searching the previous requests by label (csrf), component 122 will attempt to search by value and be able to find it in the HTML. Further, if the request is for downloading a JavaScript file, ATA will extract all global variables (starting with let or var as keywords) and use these name=value initializers for the matching algorithm explained above. In various embodiments, the JavaScript files can be modified on the fly by the backend for the purpose of CSRF or related correlated information propagation. However, the CSRF or related correlated information propagation may be done via static initializers, wherein component 122 can catch the CSRF or related correlated information propagation.

The steps where "recall" is used represents the actions of saving the information collected in the persistent storage as key-value pair by the present invention. For example, an open data interchange format object can be represented as a key-value pair and/or the query parameters can be represented in the URL.

Figure 4:
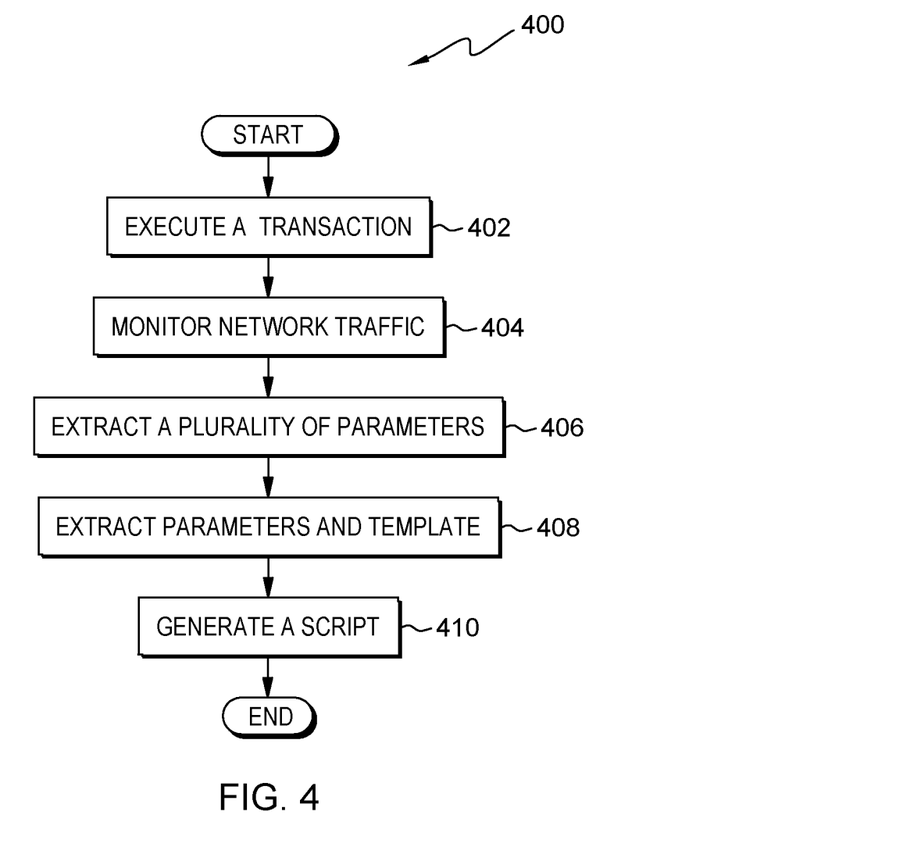
FIG. 4 illustrates operational steps of the automatic traffic analysis component, on a server computer within the distributed data processing environment of FIGS. 1A-1B, for data migration in application performance monitoring, in accordance with an embodiment of the present invention.

FIG. 4 illustrates operational steps of component 122, generally designated 400, in communication with server computer 120, within distributed data processing environment 100 of FIG. 1A and/or FIG. 1B, for data migration in application performance monitoring, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, component 122 executes a transaction. In some embodiments the transaction is synthetic. In various embodiments, component 122 executes a transaction to monitor the performance of an application. For example, component 122 executes a synthetic transaction to monitor performance of a business application.

In step 404, component 122 monitors network traffic. In various embodiments, component 122 monitors network traffic during transaction execution.

In step 406, component 122 extracts a plurality of parameters. In various embodiments, component 122 a plurality of parameters indicative of the synthetic transaction from the network traffic.

In step 408, component 122 extracts parameters and templates. In various embodiments, component 122 extracted parameters and a template to generate a script that would result in the same synthetic transaction.

In step 410, component 122 generates a script. In various embodiments, component 122 generates one or more scripts based on the extracted parameters and template. Component 122 may output and execute the generated script, wherein the executed generated script generates the same transaction in step 402.

Figure 5:
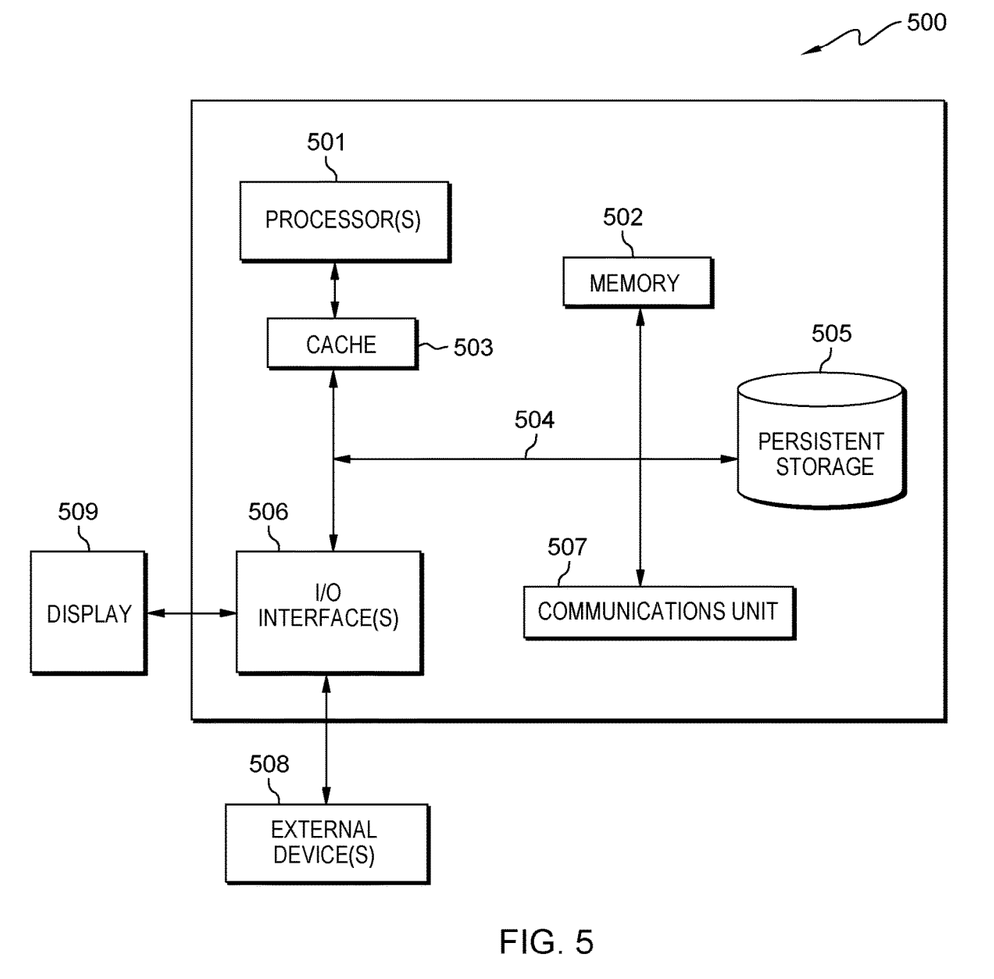
FIG. 5 depicts a block diagram of components of the server computer executing the automatic traffic analysis component within the distributed data processing environment of FIGS. 1A-1B, in accordance with an embodiment of the present invention.

FIG. 5 depicts computer system 500, where server computing 120 represents an example of computer system 500 that includes component 122. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (such as microprocessors, communications, and network processors, etc.), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for data migration in application performance monitoring, the computer-implemented method comprising:
   executing a first synthetic transaction to monitor an application;
   monitoring network traffic during the execution of the first synthetic transaction;
   extracting a plurality of parameters indicative of the first synthetic transaction from the network traffic; and
   generating a script, based on the extracted plurality of parameters and a predetermined template, that generates a second synthetic transaction;
   capturing, by a network traffic collector, transaction traffic while a first script in a first language is executed; and
   generating a second script in a second language so that it executes correlated requests in a same order they are received or generated, wherein the first and second language are predetermined.

2. The computer-implemented method of claim 1, further comprising:
   executing the generated script to generate the second synthetic transaction.

3. The computer-implemented method of claim 1, further comprising:
   detecting a correlation between requests performed by custom scripts that execute synthetic transactions by identifying query parameters, headers dynamic values, POST body objects; and
   searching through previous requests for a label or a value that is the same as the first synthetic transaction.

4. The computer-implemented method of claim 1, further comprising:
   combining insights from multiple domains to automatically analyze a correlation between asynchronous hypertext transfer protocol (HTTP) requests.

5. The computer-implemented method of claim 1, further comprising:
   removing vendor lock-in situations.

6. The computer-implemented method of claim 1, further comprising:
   generating a new script that executes received or generated requests in the same order the requests are received or generated, wherein generating a new script comprises:
      utilizing a wait time between an original request to identify a correlation based on a correlation analyzer data analysis, wherein the new script comprises a different language from a previous script.

7. A computer system for data migration in application performance monitoring, the computer system comprising:
one or more computer processors;
one or more computer readable storage devices;
program instructions stored on the one or more computer readable storage devices for execution by at least one of the one or more computer processors, the stored program instructions comprising:
program instructions to execute a first synthetic transaction to monitor an application;
program instructions to monitor network traffic during the execution of the first synthetic transaction;
program instructions to extract a plurality of parameters indicative of the first synthetic transaction from the network traffic;
program instructions to generate a script, based on the extracted plurality of parameters and a predetermined template, that generates a second synthetic transaction;
program instructions to capture, by a network traffic collector, transaction traffic while a first script in a first language is executed; and
program instructions to generate a second script in a second language so that it executes correlated requests in a same order they are received or generated, wherein the first and second language are predetermined.

8. The computer system of claim 7, further comprising:
program instructions to execute the generated script to generate the second synthetic transaction.

9. The computer system of claim 7, further comprising:
program instructions to detect a correlation between requests performed by custom scripts that execute synthetic transactions by identifying query parameters, headers dynamic values, POST body objects; and
program instructions to search through previous requests for a label or a value that is the same as the first synthetic transaction.

10. The computer system of claim 7, further comprising:
program instructions to combine insights from multiple domains to automatically analyze a correlation between asynchronous hypertext transfer protocol (HTTP) requests.

11. The computer system of claim 7, further comprising:
program instructions to remove vendor lock-in situations.

12. The computer system of claim 7, further comprising:
program instructions to generate a new script that executes received or generated requests in the same order the requests are received or generated, wherein generating a new script comprises:
program instructions to utilize a wait time between an original request to identify a correlation based on a correlation analyzer data analysis, wherein the new script comprises a different language from a previous script.

13. A computer program product for data migration in application performance monitoring, the computer program product comprising:
one or more computer readable storage devices and program instructions stored on the one or more computer readable storage devices, the stored program instructions comprising:
program instructions to execute a first synthetic transaction to monitor an application;
program instructions to monitor network traffic during the execution of the first synthetic transaction;
program instructions to extract a plurality of parameters indicative of the first synthetic transaction from the network traffic;
program instructions to generate a script, based on the extracted plurality of parameters and a predetermined template, that generates a second synthetic transaction;
program instructions to capture, by a network traffic collector, transaction traffic while a first script in a first language is executed; and
program instructions to generate a second script in a second language so that it executes correlated requests in a same order they are received or generated, wherein the first and second language are predetermined.

14. The computer program product of claim 13, further comprising:
program instructions to detect a correlation between requests performed by custom scripts that execute synthetic transactions by identifying query parameters, headers dynamic values, POST body objects; and
program instructions to search through previous requests for a label or a value that is the same as the first synthetic transaction.

15. The computer program product of claim 13, further comprising:
program instructions to combine insights from multiple domains to automatically analyze a correlation between asynchronous hypertext transfer protocol (HTTP) requests.

16. The computer program product of claim 13, further comprising:
program instructions to remove vendor lock-in situations.

17. The computer program product of claim 13, further comprising:
program instructions to generate a new script that executes received or generated requests in the same order the requests are received or generated, wherein generating a new script comprises:
program instructions to utilize a wait time between an original request to identify a correlation based on a correlation analyzer data analysis, wherein the new script comprises a different language from a previous script.

* * * * *